United States Patent [19]
Renault et al.

[11] 3,832,454
[45] Aug. 27, 1974

[54] PROCESS FOR MANUFACTURING SULFUR FROM A GAS CONTAINING HYDROGEN SULFIDE AND SULFUR DIOXIDE

[75] Inventors: Phillippe Renault, Noisy-le-Roi; Andre Deschamps, Chatou; Claude Dezael, Maisons-Laffitte, all of France

[73] Assignee: Institut Francais du Petrole, des Carburants et Lubrifiants, Rueil-Malmaison, France

[22] Filed: Jan. 11, 1972

[21] Appl. No.: 216,988

[30] Foreign Application Priority Data
Jan. 19, 1971   France .............................. 71.01717
Mar. 24, 1971   France .............................. 71.18746

[52] U.S. Cl. ................................ 423/574, 423/575
[51] Int. Cl. ........................................... C01b 17/04
[58] Field of Search ................... 423/575, 222, 243

[56] References Cited
UNITED STATES PATENTS
927,342   7/1909   Feld et al. ........................... 423/575
3,441,379   4/1969   Renault ............................... 423/575
3,598,529   8/1971   Deschamps et al. ................. 423/575

*Primary Examiner*—G. O. Peters
*Attorney, Agent, or Firm*—Millen, Raptes & White

[57] ABSTRACT

Sulfur is manufactured from hydrogen sulfide and sulfur dioxide at a temperature of from 100° to 180°C in a reaction medium comprising ammonia and an organic solvent containing an alkali metal salt of a weak acid. The outflow from the reaction zone may be cooled down and washed in two steps and the condensates may be recycled to the reaction zone. The process is particularly useful for controlling atmospheric pollution.

24 Claims, 1 Drawing Figure

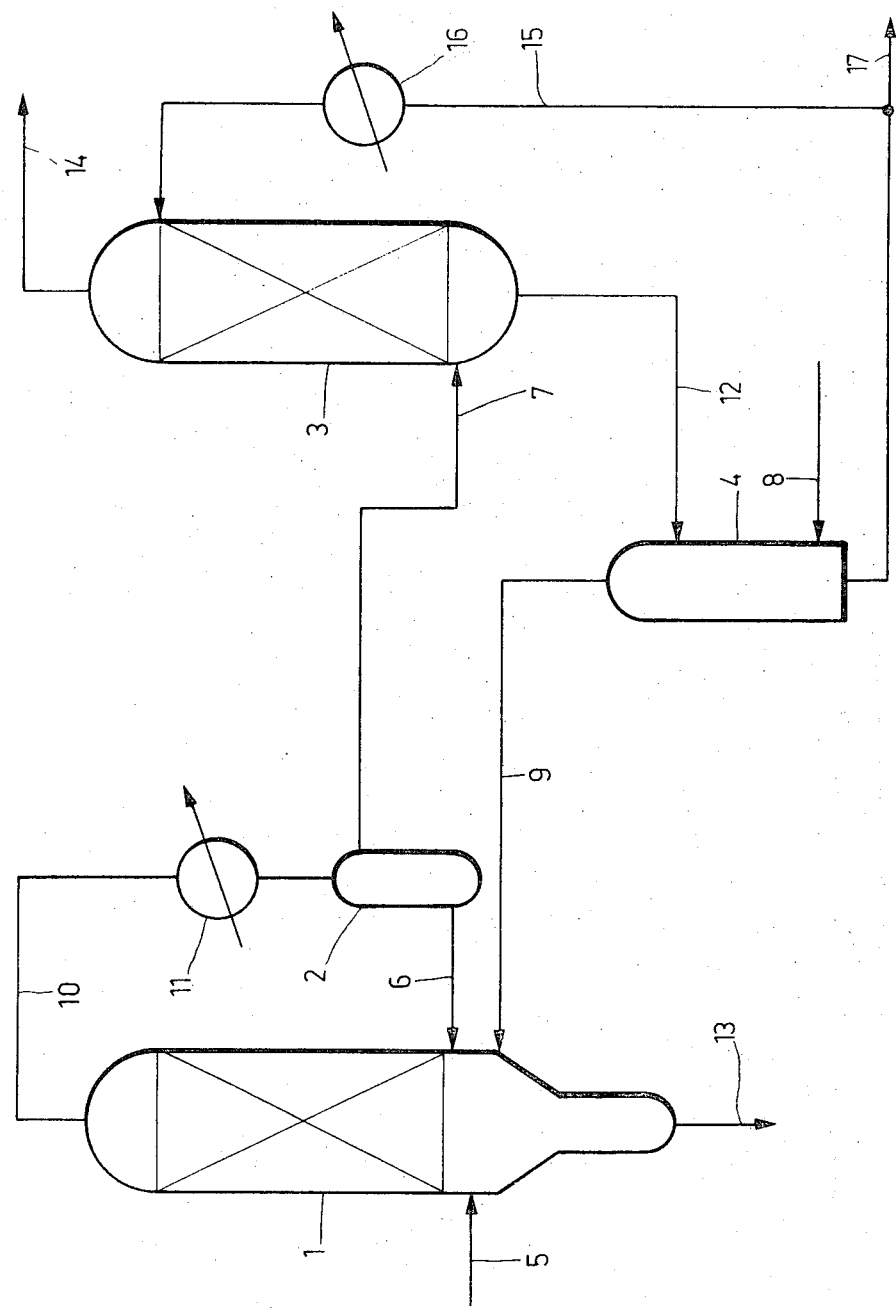

PROCESS FOR MANUFACTURING SULFUR FROM A GAS CONTAINING HYDROGEN SULFIDE AND SULFUR DIOXIDE

This invention relates to an improved process for manufacturing sulfur from acid gases containing hydrogen sulfide and sulfur dioxide.

Many plants are known to limit poisonous gases such as $H_2S$ and/or $SO_2$ to the atmosphere. For example, the outflows from Claus units contain, even after several catalytic stages, substantial amounts of such gases which are harmful atmospheric pollutants.

According to a process described in the French Pat. No. 1,592,092 or the U.S. Pat. No. 3,598,529, noxious gases are purified and sulfur is manufactured by reacting hydrogen sulfide with sulfur dioxide according to the reaction:

$$2\ H_2S + SO_2 \rightarrow 3\ S + 2\ H_2O$$

In said process the reaction medium consists of an inert organic solvent and a catalyst selected from the alkali and earth-alkaline metal salts of organic acids.

This process, although satisfactory in many cases, is not adapted to achieve a thorough purification of gas outflows, such as will be required in the future. Other catalysts have also been proposed, which do not give improved results.

It is a first object of this invention to provide an improved process for manufacturing sulfur from a gas containing hydrogen sulfide and sulfur dioxide, said process comprising contacting said gas both with an organic solvent containing an alkali metal salt of a weak acid and with ammonia, at a temperature of from 100° to 180°C and preferably from 115° to 160°C. Ammonia is advantageously used in an amount of from 0.01 to 10 percent and preferably from 0.2 to 10 percent by volume of the treated gas.

Another object of this invention is a process for manufacturing sulfur, in which hydrogen sulfide and sulfur dioxide are reacted at a temperature of from 100° to 180°C in contact with an inert organic solvent and with ammonia, with or without an alkali metal salt of a weak acid or other co-catalyst. According to this process the gas outflow from the contact zone, which contains ammonia and unconverted $SO_2$ and $H_2S$ is partially cooled down so as to condense a part thereof in the form of an aqueous phase containing a substantial proportion of ammonium sulfite; it is then further cooled down and washed with water, so as to recover an aqueous phase containing a substantial proportion of ammonium sulfide; the ammonium sulfite of the condensate is recycled to the reaction zone and the aqueous phase containing ammonium sulfide is evaporated partially and the resulting gas containing hydrogen sulfide and ammonia is recycled to the reaction zone.

After the first cooling, the outflow has a temperature of, for example, 60° to 90°C, and, after the second cooling and water washing, a temperature of, for example, 20° to 50°C.

As compared to a cooling of gas in one step, this embodiment has the advantage of a reduced heat consumption, a better rate of recovery of $H_2S$ and $SO_2$ and a reduction of undesired by-products such as thiosulfates. Further, the recycled gas has a higher content of $H_2S$ and $SO_2$ since only limited amounts of water are evaporated.

Irrespective of the selected embodiment, there is introduced into the reaction zone a gas with a content of acid sulfur compounds such as $H_2S$ and $SO_2$ in the range of, for example, from 0.2 to 5 percent by volume and preferably from 0.5 to 2 percent by volume. This gas may be an outflow from a Claus unit, which contains said acid compounds in a molar ratio of $H_2S$ to $SO_2$ of about 2.

The temperature in the reaction zone may be selected from 115° to 160°C and preferably from 125° to 140°C. The organic solvent in said zone may be selected from the many stable organic solvents; however it is preferably chosen amongst the following ones:

tetramethylene sulfone, the triesters of orthophosphoric acid, heavy alcohols of, for example, 12 to 20 carbon atoms, alcohol esters.

However the following solvents are preferred:

alkylene glycols, alkylene glycol ethers and/or esters, polyalkylene glycols, polyalkylene glycol ethers and esters, for example ethylene glycol and its ethers and esters, and polyethylene glycol and their ethers and esters.

The following specific examples are illustrative of these solvents: ethylene glycol, triethylene glycol, heptaethylene glycol, di-1,3-propylene glycol, penta-1,3-propylene glycol, decaethylene glycol mono-ethyl ether, tetra-1,4-butene glycol, polyethylene glycol having an average molecular weight of about 400, hexaethylene glycol monopropyl ether monoacetate and monobutyrate.

Said solvent may contain a catalyst consisting of an alkali metal salt of a weak acid, the latter being defined as an acid whose acidity or, in the case of a polyvalent acid, whose first acidity is expressed by a pK of at least 2.5.

Preferred organic carboxylic acids are those described in French Pat. No. 1,592,092 or corresponding U.S. Pat. No. 3,598,529.

Preferred salts are, for example, the following: The sodium and postassium salts of mono- or polyvalent carboxylic acids such as: caproic, adipic, tartaric, cyclohexane carboxylic, benzoic, ortho-phthalic, salicylic and 3-pyridine carboxylic (nicotinic).

Preferred salts to be used as catalysts are: Potassium citrate, potassium adipate, sodium or potassium cyclohexane carboxylate, sodium benzoate, potassium benzoate, potassium phthalate or hydrogen phthalate and potassium salicylate.

Preferred species are potassium benzoate and dipotassium phthalate.

Partial esters of polycarboxylic acids may be used as organic acids, provided they have at least one free acid group. The following are mentioned by way of examples: those mentioned in the French Pat. No. 1,582,762 and the French Pat. application No. 70,430,77. Sodium and potassium are preferably associated to the above esters.

The concentration of the catalyst in the solvent usually ranges from 0.15 to 20 g/kg and preferably from 4 to 12g per kg of solvent.

Ammonia is introduced into the reaction zone in such an amount that its content, expressed as gaseous $NH_3$, is from 0.01 to 10 percent by volume and preferably from 0.5 to 5 percent by volume.

Ammonia may be normally present in the gas to be purified; however it may be introduced separately into the reaction zone. It may be introduced either pure, in the gaseous state, or with water; alternatively it may be contained in the gas mixture resulting from vaporizing aqueous solutions of ammonia salts such as ammonium sulfites or sulfides.

According to a particular embodiment, the sulfite or sulfide solutions may result from contacting with ammonia unconverted hydrogen sulfide and sulfurous anhydride from the reaction zone.

According to a preferred embodiment, the invention may be performed as follows: use is made of the gaseous effluent withdrawn from the reaction zone in which $H_2S$ has been reacted with $SO_2$, in the presence of a liquid phase, at a temperature, for example, higher than 115°C. This effluent contains residual $H_2S$ and $SO_2$ in addition to a substantial amount of ammonia. It is first cooled down to about 60° to 90°C, preferably 65° to 75°C. This cooling results in the condensation of a small amount of water and in the almost complete recovery of sulfurous anhydride in the form of ammonium sulfites. The effluent is then cooled again to a temperature below its dew point, and it is contacted with water at a temperature of from 20° to 50°C, preferably 35° to 45°C, so as to insure the almost complete recovery of hydrogen sulfide and ammonia. During this operation, 1 part of $CO_2$, when present, is extracted from the resulting ammonia solution.

The ammonia brine recovered from the bottom of the second cooling zone is reheated up to a temperature of about 100°C, for example 80° to 120°C, and introduced into a stripper at the bottom of which an inert gas is injected, for example steam, to remove any dissolved $H_2S$ and $NH_3$. The sulfites recovered in the first washing zone may be reintroduced into the reaction zone after optional cooling.

The above embodiment, illustrated by FIG. 1 is given by way of example. The effluent containing the acid gas is introduced through pipe 5 into the bottom part of reactor 1. This effluent contains $H_2S$ and $SO_2$, preferably in stoichiometric proportions; when it is not the case, the missing gas has to be introduced therein. Ammonia is admitted through pipe 7 and/or 9, either alone or as ammonium sulfite or sulfide.

The gaseous effluent, as discharged from pipe 10, contains a substantial proportion of $SO_2$ and $H_2S$, in addition to $NH_3$ which takes no part in the reaction. It is cooled down to 70°C in condenser 11. The resulting liquid phase and the residual gas are separated in separator 2. This liquid phase consists essentially of water and ammonium sulfites. It is introduced into the reactor through line 6, either as such or as $SO_2$ and $NH_3$ after partial vaporization.

The gaseous effluent is then passed through pipe 7 and introduced into zone 3 for water washing and cooling at a temperature of, for example, 40°C. It is withdrawn through pipe 14.

The aqueous ammonium sulfide solution (line 12), obtained by water-washing at 40°C of unconverted $H_2S$ and ammonia, is stripped in unit 4, at the base of which steam is injected (line 8). The aqueous overhead is recycled by line 9, in the gaseous state, to the bottom of the reactor 1. The remaining water is recycled through line 15 and exchanger 16. A purge is provided through line 17.

The acid gases of lines 5, 6 and 9 introduced into the reactor react in contact with the solvent containing ammonia and, for example, a potassium salt, to give sulfur which settles at the bottom of the reactor and is withdrawn through line 13. The ammonia escaping from the reactor in admixture with untransformed acid gases is used in units 2 and 3 as reaction agent, i.e., to form ammonium sulfite and ammonium sulfide respectively.

Another embodiment consists of introducing, at the bottom of reactor 1, vapor produced in unit 4 by stripping residual water containing ammonium sulfide.

According to the process of this invention, the acid gases $SO_2$ and $H_2S$ and ammonia may be introduced separately into the liquid medium in which they bubble, or they are admixed together before contacting the liquid phase. It is essential to obtain a good contact between the gas and the liquid, and this is obtained, for example, in a packed tower, with a mechanical stirrer, or by suspending the liquid in the gaseous effluent by means of, for example, a venturi device.

It has been discovered that ammonia, when present in the reaction zone, even in amounts lower than 0.2 percent by volume in the gaseous phase, improves the catalytic stability of the alkali metal salts of this invention.

It has been found that with ammonia contents of from 0.01 to 0.2 percent by volume, which do not strongly increase the conversion rates of the acid gases to sulfur, the activity of the catalysts is maintained over longer periods. This is also true of the ammonia concentrations of from 0.2 to 10 percent by volume.

EXAMPLE 1 (comparative)

A smoke which has the following composition by volume:

| | |
|---|---|
| $SO_2$ | 0.5 % |
| $H_2S$ | 1 % |
| $H_2O$ | 25 % |
| $CO_2$ | 16 % |
| $N_2$ | 57.5 % | is injected at a rate of 500 liters per hour at the bottom of a tower of 4 cm diameter, fit with perforated plates.

The tower contains 300 cc of PEG 400, the average molecular weight of which is 400, containing 2 grams of potassium benzoate. The solution is maintained at 130°C. The purified gas contains only 0.3 percent of $H_2S$ and $SO_2$. The purification yield was 80 percent.

EXAMPLE 2 (comparative)

Example 1 is repeated with 300 cc of PEG 400 containing 10 grams of potassium benzoate. Under the conditions of example 1, the yield is 81.2 percent.

EXAMPLE 3 (comparative)

Example 1 is repeated with the same solvent without any potassium benzoate content. 50 liters of ammonia per hour are admitted to the reactor. The purification yield is 70.1 percent.

EXAMPLE 4 (comparative)

Example 3 is repeated, except that the feed rate of ammonia is 100 liters per hour. The purification yield is 70.5 percent.

EXAMPLE 5 (comparative)

Example 1 is repeated without change (including 2 grams of potassium benzoate in the polyethylene glycol), but with the addition of 5 liters per hour of ammonia. The purification yield attains 86.3 percent.

EXAMPLE 6 (comparative)

Example 1 is repeated, except that 0.6 grams of potash are added to the potassium benzoate containing solvent. The purification yield is 80 percent.

EXAMPLE 7

Example 7 illustrates the invention as performed according to the preferred embodiment of FIG. 1, described hereinbefore. The volumes are determined under the normal conditions of pressure and temperature.

22,000 m³/hour of a smoke with the following composition by volume:

| | | | |
|---|---|---|---|
| $H_2S$ | 0.90 % | $CO_2$ | 2.10 % |
| $SO_2$ | 0.50 % | $H_2$ | 1.12 % |
| COS | 0.01 % | $H_2O$ | 29.97 % |
| $N_2$ | 65.40 % | | | are introduced at the bottom of reactor (1), together with the vapor resulting from the stripping in unit (4) of the brine recovered in absorber (3).

The outflow from stripper (4), whose composition by volume is:

| | |
|---|---|
| $H_2S$ | 8.6 % |
| $CO_2$ | 7.4 % |
| $NH_3$ | 26 % |
| $H_2O$ | 58 % | is admitted at the bottom of reactor (1).

The solution recovered from condenser (2), which contains sodium sulfite, is vaporized so as to obtain an outflow containing by volume:

| | |
|---|---|
| $SO_2$ | 13 % |
| $NH_3$ | 25 % |
| $H_2O$ | 62 % |

All these outflows are passed at 135°C and 1.05 at through polyethylene glycol of molecular weight 400 containing 1.2 grams of di-potassium phthalate per kg of solvent, and contained in a packed tower.

The purified smoke has the following composition by volume:

| | | | |
|---|---|---|---|
| $H_2S$ | 0.22% | $N_2$ | 63.30 % |
| $SO_2$ | 0.12 % | $CO_2$ | 2.2 % |
| COS | 0.01 % | $H_2O$ | 32.1 % |
| $NH_3$ | 0.85 % | $H_2$ | 1.20 % |

It is then cooled down to 75°C and partly condensed to yield a solution of ammonium sulfite which is recycled to reactor (1); then it is passed to absorber (3) in which $H_2S$, a part of $CO_2$ and nearly all the ammonia are retained by the washing water and result in a solution which is reheated to 110°C and reintroduced into stripper (4) at the bottom of which steam is injected. The pressure is 1.1 at.a. in unit (4). The smoke thus treated is withdrawn from (3). It contains only 200 ppm of $H_2S$ and 200 ppm of $NH_3$.

EXAMPLE 8 (comparative)

A fume whose feed rate is 500 liters per hour and whose composition by volume is:

| | | | |
|---|---|---|---|
| $SO_2$ | 0.5 % | $CO_2$ | 16 % |
| $H_2S$ | 1 % | $N_2$ | 57.5 % |
| $H_2O$ | 25 % | | | is introduced under atmospheric pressure at the bottom of a tower of 4 cm diameter, this column containing perforated plates.

300 cc of PEG 400 (polyethylene glycol having an average mol. weight of 400) containing 2 grams of potassium benzoate are present in the column. The solution is maintained at 130°C. During the first hours, the gas contains only 0.3 percent of $H_2S$ and $SO_2$ (purification yield of 80 percent). After 60 hours of run, the yield is 70 percent, and after 100 hours, the $H_2S$ and $SO_2$ content is 0.75 percent by volume (purification yield of 50 percent).

EXAMPLE 9 (according to the invention)

Example 8 is repeated without change, with 2 grams of potassium benzoate in PEG 400, but with the addition of 0.3 liter of ammonia per hour. The purification yield is 80.2 percent at the beginning and is still unchanged after 60 hours of run. After 100 hours, it is 80 percent. After 200 hours, the content of $H_2S$ and $SO_2$ is 0.37 percent, which represents a purification yield of about 75 percent.

What we claim as our invention is:

1. In a process for manufacturing sulfur from a gas containing hydrogen sulfide and sulfur dioxide, comprising passing the gas, at a temperature of from 100° to 180°C, through an organic solvent containing a catalytic amount of an alkali metal salt of a weak acid, the improvement wherein the sulfur is produced in the presence of a catalyst-stabilizing quantity of ammonia, whereby the activity of the alkali metal salt catalyst is extended.

2. A process according to claim 1, in which the temperature is selected from 115° to 160°C and the proportion of ammonia is from 0.2 to 10 percent by volume of the treated gas.

3. A process according to claim 1, in which the salt is an alkali metal salt of an organic monocarboxylic acid, an organic polycarboxylic acid, an ester thereof or a mixture thereof.

4. A process according to claim 2, in which the organic solvent is an alkylene glycol, a polyalkylene glycol, an ether, ester or ether-ester of alkylene glycol or polyalkylene glycol.

5. A process according to claim 3, in which the salt is a sodium or potassium salt of an organic monocarboxylic acid.

6. A process for manufacturing sulfur by reacting hydrogen sulfide with sulfurous anhydride contained in a gas, at a temperature of from 100° to 180°C, in contact with an organic solvent, wherein the reaction is carried out in the presence of ammonia, the gas outflow from the contact zone, which contains unconverted $SO_2$ and $H_2S$ in addition to ammonia, is cooled down partially so as to condense a part thereof in the form of an aqueous phase containing a substantial amount of ammonium sulfite, then is further cooled down and washed with water so as to collect an aqueous phase containing a substantial amount of ammonium sulfide, the ammonium sulfite from the condensate is recycled to the reaction zone, the aqueous phase containing ammonium sulfide is partially svaporated and the resulting gas, containing hydrogen sulfide and ammonia is recycled to the reaction zone.

7. A process according to claim 6, in which the ammonia proportion is from 0.01 to 10 percent by volume of the treated gas.

8. A process according to claim 6, in which the reaction temperature is 115° to 160°C and the ammonia proportion is 0.2 to 10 percent by volume of the treated gas.

9. A process according to claim 6, in which the condensate containing ammonium sulfite is vaporized before being recycled to the reaction zone in the form of a gas stream containing sulfurous anhydride and ammonia.

10. A process according to claim 6, in which the partial condensation of the gas outflow is carried out at 60° to 90°C and the washing with water at 20° to 50°C.

11. A process according to claim 6, in which the partial vaporisation of the aqueous solution of ammonium sulfide is carried out at 80° to 120°C.

12. A process according to claim 6, in which the gas containing hydrogen sulfide and sulfurous anhydride is an effluent of a Claus converter.

13. A process according to claim 6 wherein the organic solvent contains an alkali metal salt of a weak acid.

14. A process as defined by claim 7 wherein the hydrogen sulfide and sulfurous anhydride contained in the gas are present in a concentration of 0.2 to 5 percent by volume.

15. A process as defined by claim 8 wherein the hydrogen sulfide and sulfurous anhydride contained in the gas are present in a concentration of 0.5 to 2 percent by volume.

16. A process according to claim 1, in which ammonia is used in an amount of 0.01 to 10 percent by volume of the treated gas.

17. A process according to claim 1, in which the salt is an alkali metal salt of an organic monocarboxylic acid, an organic polycarboxylic acid, an ester thereof or a mixture thereof.

18. A process according to claim 1, in which the organic solvent is an alkylene glycol, a polyalkylene glycol, an ether, ester or ether-ester of alkylene glycol or polyalkylene glycol.

19. A process according to claim 17, in which the salt is a sodium or potassium salt of an organic monocarboxylic-acid.

20. A process as defined by claim 16 wherein the hydrogen sulfide and sulfurous anhydride contained in the gas are present in a concentration of 0.2 to 5 percent by volume.

21. A process as defined by claim 2 wherein the hydrogen sulfide and sulfurous anhydride contained in the gas are present in a concentration of 0.5 to 2 percent by volume.

22. A process as defined by claim 1 wherein the content of the ammonia in contact with the organic solvent is less than 0.2 percent by volume of the gaseous phase.

23. A process as defined by claim 22 wherein the hydrogen sulfide and sulfurous anhydride contained in the gas are present in a concentration of 0.5 to 2 percent by volume.

24. A process according to claim 17, in which the organic solvent is an alkylene glycol, a polyalkylene glycol, an ether, ester or ether-ester of alkylene glycol or polyalkylene glycol.

* * * * *

UNITED STATES PATENT OFFICE
CERTIFICATE OF CORRECTION

Patent No. 3,832,454      Dated August 27, 1974

Inventor(s) Philippe Renault, et al.

It is certified that error appears in the above-identified patent and that said Letters Patent are hereby corrected as shown below:

IN THE HEADING, UNDER "FOREIGN APPLICATION PRIORITY DATA":

"Mar. 24, 1971" should read -- May 24, 1971 --.

IN THE CLAIMS:

CLAIM 3, LINE 1, COLUMN 6: "claim 1" should read -- claim 13 --.

Signed and sealed this 19th day of November 1974.

(SEAL)
Attest:

McCOY M. GIBSON JR.
Attesting Officer

C. MARSHALL DANN
Commissioner of Patents